(12) United States Patent
Ittycheriah et al.

(10) Patent No.: US 7,218,730 B2
(45) Date of Patent: May 15, 2007

(54) SYSTEM AND METHOD FOR ANALYSIS AND FILTERING OF SIGNALS IN A TELECOMMUNICATIONS NETWORK

(75) Inventors: Abraham P. Ittycheriah, Danbury, CT (US); Jeffrey S. Sorenson, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 10/639,883

(22) Filed: Aug. 13, 2003

(65) Prior Publication Data

US 2005/0039070 A1 Feb. 17, 2005

(51) Int. Cl.
*H04M 9/08* (2006.01)
(52) U.S. Cl. .......................... 379/406.01; 379/406.02; 379/406.05; 379/406.08
(58) Field of Classification Search ........... 379/406.01–406.16; 700/2, 3, 94
See application file for complete search history.

(56) References Cited

U.S. PATENT DOCUMENTS

| | | | | |
|---|---|---|---|---|
| 3,894,200 A * | 7/1975 | Campanella et al. | .. | 379/406.11 |
| 5,001,701 A | 3/1991 | Gay | ......................... | 370/32.1 |
| 5,170,470 A | 12/1992 | Pindar et al. | ............... | 395/275 |
| 5,371,789 A | 12/1994 | Hirano | ....................... | 379/410 |
| 5,420,987 A | 5/1995 | Reid et al. | .................. | 395/325 |
| 5,537,646 A | 7/1996 | Buck et al. | ................. | 395/500 |
| 5,587,998 A | 12/1996 | Velardo, Jr. et al. | ........ | 370/289 |
| 5,594,719 A | 1/1997 | Oh et al. | ..................... | 370/286 |
| 5,623,695 A | 4/1997 | Lozinski et al. | ............ | 395/828 |
| 5,634,074 A | 5/1997 | Devon et al. | ............... | 395/828 |
| 5,657,384 A | 8/1997 | Staudacher et al. | ......... | 379/388 |
| 5,657,423 A | 8/1997 | Benbassat et al. | ......... | 395/2.39 |
| 5,666,407 A | 9/1997 | Pfeifer | ....................... | 379/406 |
| 5,719,998 A | 2/1998 | Ku et al. | .................... | 395/2.91 |
| 6,845,412 B1 * | 1/2005 | Boike et al. | .................. | 710/36 |
| 7,023,963 B1 * | 4/2006 | Chu et al. | ................. | 379/15.05 |
| 2002/0064139 A1 * | 5/2002 | Bist et al. | .................... | 370/289 |
| 2003/0081762 A1 * | 5/2003 | Zad Issa | ................ | 379/406.01 |

FOREIGN PATENT DOCUMENTS

EP      1233336 A2 *   8/2002

OTHER PUBLICATIONS

George Carayanis, *A Fast Sequential Algorithm for Least-Squares Filtering and Prediction*, IEEE Trans. On Acoustics, Speech and Signal Processing, vol. ASSP-31, No. 6, Dec. 1983, pp. 1394-1402.

* cited by examiner

*Primary Examiner*—Ramnandan Singh
(74) *Attorney, Agent, or Firm*—F.Chau & Associates LLC; Michaël F. Morano

(57) ABSTRACT

A system and method for signal analysis in a network. The method includes attempting, by a first processor, to compute optimal coefficients for filtering a signal, determining that computing the optimal coefficients exceeds the computational capabilities of the first processor, notifying a second processor that computing the optimal coefficients exceeds the computational capabilities of the first processor, and computing, by the second processor, the optimal coefficients. The system and method account for limited computational resources allocated to certain processors in a telecommunications system.

21 Claims, 4 Drawing Sheets

SYSTEM AND METHOD FOR ANALYSIS AND FILTERING OF SIGNALS IN A TELECOMMUNICATIONS NETWORK

BACKGROUND OF THE INVENTION

1. Field of the Invention

The present invention relates to a system and method for signal analysis and, more particularly, to a system and method for analysis and filtering of signals in a telecommunications network.

2. Description of the Related Art

Contemporary telecommunications systems can be elaborate and heterogeneously created. Many attributes of these systems are based on early electric communication systems and modern digital systems are often engineered to recreate the some of the familiar characteristics of telephone networks when they were composed mainly of copper wire "pairs."

One aspect of land line communication familiar to telephone users is the tendency of signals to be echoed back to the source of the signal. Some echo may be desirable when it gives a speaker the impression that the phone is "live" and picking up their speech. However, repeated echoes or echoes delayed by a fraction of a second can make telephone communication difficult or impossible. In addition, speakerphone systems are subject to echoes caused by room acoustics and a telecommunications network. Echoes can be especially problematic for computerized speech recognition systems, which often require that echo signals be removed so that recognition can be accurate.

Signal processing techniques, using digital signal processors in consumer devices and telecommunications hardware, have been developed to control reverberant signals. Reflected signals may originate from a number of sources, vary across different frequency ranges and are subject to different delays.

A known two-wire analog telecommunications system 100 is shown in FIG. 1. As shown in FIG. 1, the telecommunications system 100 includes two hybrids 140 connected between two wires 130. A hybrid 140 is a filter that matches the impedance from one part of the network to another and is a component of a telecommunications system that, for example, causes echoes in a telephone network.

A telecommunications system may have many junction points, each potentially capable of both signal transmission and reflection, and may include hybrids at each junction point. For example, a network may include a "near-end" hybrid located near a signal transmission point. The near-end hybrid includes specific reflection characteristics familiar to telephone users, allowing for the near-end echo that gives a telephone its live microphone quality. A near-end echo canceller may be employed to protect a "far-end" caller (i.e., a caller at the signal receiving point) from the near-end echo. A near-end echo canceller is used, for example, when a telecommunications system is simultaneously "playing" output and "listening" to input. The use of a near-end echo canceller helps a system avoid confusing its own output with a signal from the far-end. Some systems, such as speech recognition and speakerphone systems, have encountered difficulty when attempting to remove the near-end echo.

A far-end echo develops at a network junction at a receiver side. The far-end echo can be a large fraction of a second and may be noticeable when making international or other calls over large geographical distances. A far-end echo canceller may be employed to protect a near-end caller from the far-end echo. However, many commercial echo cancellation systems are not capable of removing far-end echoes with long delays (e.g., a large fraction of a second) because such echoes require large and complex filters for their removal.

Telecommunications systems may employ a variety of different subsystems with different capabilities throughout the network environment. For example, a public branch exchange (PBX) system or an integrated voice response system (IVR) are both examples of systems where a number of separate telephone channels or lines are controlled by a single computer, with specialized compute resources dedicated to each channel. The compute resources are known as "line cards."

FIG. 2 shows a conventional telecommunications system 200 employing a host computer/processor 210 for controlling a plurality of line cards 220 linked to channels 225 of the network 250. Known line cards 220 have limited amounts of processing power and memory, but can be used for simple signal processing. Examples of line card functions include buffering of digital signals during conversion and transmission, tone detection for switch signals, and signal processing for echo cancellation. In the last case, complete echo cancellation systems for near end echo may be incorporated into the line cards' hardware and software. In contrast, high memory and processing requirements for far-end echo cancellation have made incorporation of far-end echo cancellation systems into line cards very costly.

An echo cancellation system incorporated into a line card may include some form of an adaptive error-feedback driven filtering algorithm known to one of ordinary skill in the art, such as least mean square (LMS) adaptive filtering. Given an input signal, and an approximate measure of an expected hybrid echo, an LMS algorithm can determine the optimal filter tap coefficients to remove most of the output signal as it is reflected back to the input, allowing, for example, a speech recognition system to listen for a party on the other end of the telephone conversation to begin speaking. However, a problem exists in that computation of the optimal filter coefficients may exceed the computational capabilities of known line cards.

In many applications, it is also desirable to attempt to compute filter coefficients that would enable the cancellation of far end echo signals and other effects, such as room reverberations caused by a speaker in a speakerphone. Attempting to compute such coefficients using the known LMS or recursive least squares (RLS) algorithms also presents a problem in that such computations would exceed the memory buffering capabilities of most known line card digital signal processors.

Therefore, there exists a need for a system and method of signal processing for echo cancellation that accounts for the limited computational resources allocated to line cards in a telecommunications system.

BRIEF SUMMARY OF THE INVENTION

A system for signal analysis in a network, in accordance with the present invention, includes a host processor, at least one resource connected to the host processor and serving at least one connection to the network and at least one filter for modifying a signal, wherein one of the at least one resource and the host processor compute optimal coefficients for the filter.

In alternate embodiments, the at least one resource may request that the host processor compute the optimal coefficients when the at least one resource determines that computation of the optimal coefficients exceeds computational capabilities of the at least one resource. For example, the at least one resource may request that the host processor compute the optimal coefficients if a magnitude of residual error exceeds a predetermined value. The host processor may communicate its availability to compute the optimal coefficients to the at least one resource and transmit the optimal coefficients to the at least one resource. The at least one resource may implement the optimal coefficients. The at least one filter may cancel a reflected signal and the at least one resource may include at least one signal processor and at least one data buffer. The system may also include at least one other processor controlled by the host processor for computing the optimal coefficients in place of the host processor.

A method for signal analysis in a network, in accordance with the present invention, includes attempting, by a first processor, to compute optimal coefficients for filtering a signal, determining that computing the optimal coefficients exceeds computational capabilities of the first processor, notifying a second processor that computing the optimal coefficients exceeds the computational capabilities of the first processor, and computing, by the second processor, the optimal coefficients.

In alternate methods, the first processor may be notified of an availability of the second processor to compute the optimal coefficients. The optimal coefficients may be transmitted to the first processor and implemented to filter a signal. The step of computing may be performed by a third processor in place of the second processor. The third processor may be controlled by the second processor. The step of determining may be based on a convergence criterion and the step of computing may incorporate an error-feedback driven filtering algorithm. The method for signal analysis in a network may further include signaling the first processor to transfer to the second processor results of attempts by the first processor to compute the optimal coefficients.

In another aspect of the present invention, a program storage device readable by a machine, tangibly embodies a program of instructions executable by the machine to perform method steps for signal analysis in a network. The method steps include determining that computing optimal coefficients for filtering a signal exceeds computational capabilities of a first processor, notifying a second processor that computing the optimal coefficients exceeds the computational capabilities of the first processor, and computing, by the second processor, the optimal coefficients.

In other embodiments, the program storage device may include instructions for notifying the first processor of an availability of the second processor to compute the optimal coefficients. The program storage device may also include instructions for transmitting the optimal coefficients to the first processor, and implementing the optimal coefficients to filter a signal. The step of computing may be performed by a third processor in place of the second processor. The third processor may be controlled by the second processor. The step of determining may be based on a convergence criterion and the step of computing may incorporate an error-feedback driven filtering algorithm. The program storage device may further include instructions for signaling the first processor to transfer to the second processor results of attempts by the first processor to compute the optimal coefficients.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

This invention addresses a telecommunications system and method where different amounts of computational resources are dedicated to different levels of the system.

A host computer/processor has a larger memory and compute resources than line card signal processors. The larger memory and resources of the host computer can be allocated to individual lines on an as needed basis and may be used to simultaneously control a large number of telephone channels.

According to the present invention, if computing optimal filter coefficients exceeds the computational capabilities of a line card, a host processor can perform the computation of the optimal filter coefficients.

Figure 1:
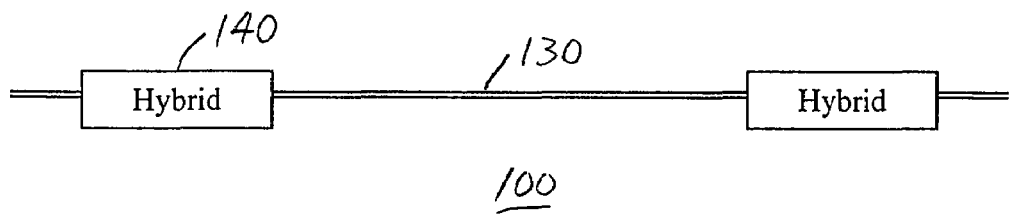
FIG. 1 is a block diagram showing a conventional two-wire analog telecommunications system.
Figure 2:
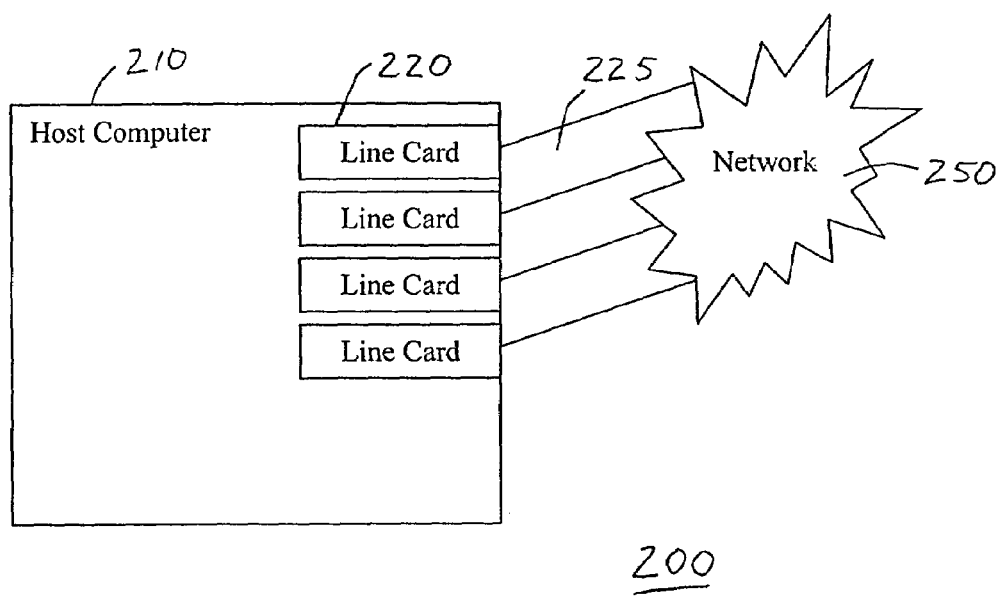
FIG. 2 is a block diagram showing a conventional telecommunications system employing a host computer.
Figure 3:
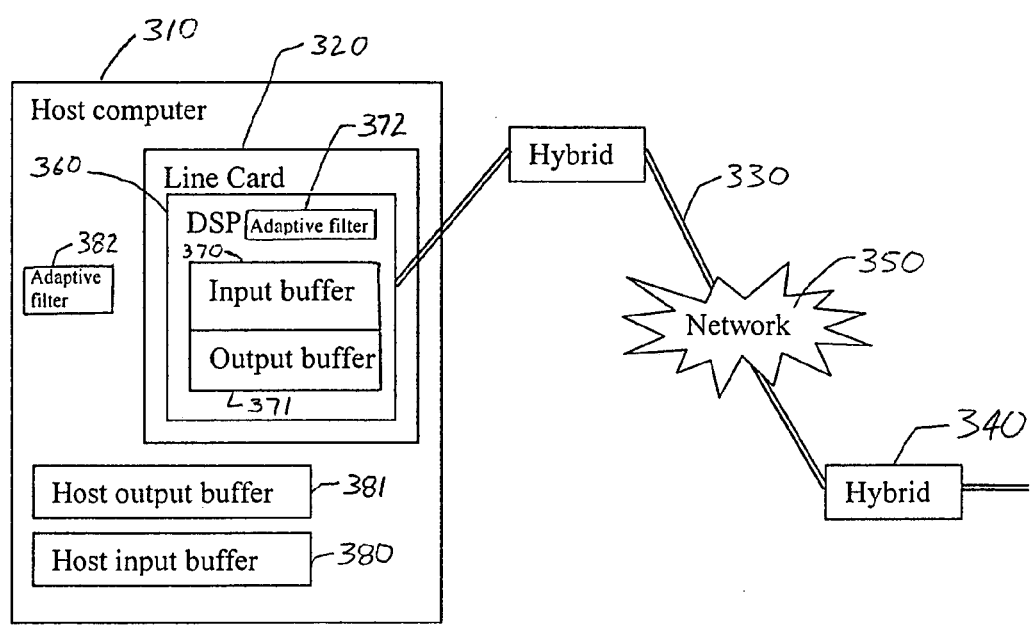
FIG. 3 is a block diagram showing a telecommunications system employing a host computer according to an embodiment of the present invention.

Referring now to the drawings in which like numerals represent the same or similar elements, FIG. 3 is a block diagram showing a telecommunications system 300 employing a host computer 310 according to an embodiment of the present invention. Referring to FIG. 3, the telecommunications system 300 consists of a host computer/processor 310 with a plurality of line cards 320, each having one or more digital signal processors 360. The digital signal processors 360 each serve one or more connections to a telephony network 350. The network connections are modeled as a pair of current carrying wires 330 that have dynamic elements, referred to as hybrid filters 340. The network 350 may consist of additional elements, such as analog/digital converters, voice codecs, fiber optics, and other such telecommunications equipment known to those skilled in the art.

In the network 350, a signal that is sent out from a transmission device may be reflected back to the transmission device with some delay and frequency dependent linear or nonlinear transformations. For the purposes of clarity, this description focuses on echoes caused at the near-end and far-end hybrids 340. However, the network 350 may be more complicated, including a teleconferencing network having more than two hybrids, and/or speakerphones at a far end.

During the establishment of a new connection, the line card 320 may use memory or data buffers 370, 371 (also referred to as transmit/receive or input/output buffers) to prepare and transmit signals and to store received signals. Information contained in the transmit and receive buffers 370, 371 may include output and received signals stored as digitally sampled and quantized values. The output signal consists of a signal being transmitted and the input signal may consist of a received signal and any output echo. Where echo cancellation is performed, the information contained in the transmit and receive buffers 370, 371 may be used to train an adaptive filter 372, which is employed to cancel the transmitted signal where it appears in the received signal. An adaptive filter 372 is an inverse of the hybrid filter 340 and seeks to approximate the signal echo of an output so that the signal echo can be removed leaving only the received signal.

The echo may occur with delay and with changes in gain that are frequency dependent. The host computer 310 may include an adaptive filter 382, which functions like the adaptive filter 372, but may be larger and capable of filtering more of an echo signal than the adaptive filter 372.

The line cards 320 contain digital signal processors 360 and software for computing LMS filter coefficients. In addition, the digital signal processor 360 is equipped with a means to estimate the magnitude of the residual error after filtering (i.e., the signal to noise ratio). For example, an LMS filter algorithm converges to an optimal set of coefficients that minimizes a level of the echo signal remaining in the filtered signal. However, even at this minimum, an unacceptable level of residual error can still remain depending on the filter size or processor capabilities. Accordingly, the value of residual error may be used to determine if the echo cancellation parameters could be more effectively calculated using the resources of an additional processor, such as the host computer 310. For example, a value of residual error (i.e., percentage of the transmitted signal appearing in the received signal after filtering) that is higher than a predetermined amount will result in a determination that the echo cancellation parameters should be calculated by the host computer 310.

When the line card 320 requests that the host computer 310 assist in the computation of the filter coefficients for the optimal echo cancellation filter, and the host computer 310 responds and acknowledges that the resources are available to perform this computation, the line card 320 transmits the current transmit and receive buffers 370, 371 to the host computer 310. The line card 320 then continues to collect additional data buffers as they are received and transmits the additional data buffers to the host computer 310 for the duration of the echo cancellation filter computation. The host computer 310 includes corresponding host buffers 380, 381, which function like the transmit and receive buffers 370, 371.

Once the host computer 310 has determined convergence for its estimate of the optimal echo cancellation filter, the digital signal processor 360 on the line card 320 is notified that the filter coefficients are available. The digital signal processor 360 then acknowledges and accepts receipt of the host computer's coefficient information and subsequently implements the filter in the line card 320, thereby freeing the host computer 310 from further involvement with a particular channel.

In another embodiment of the present invention a specialized digital signal processing resource or resources may be allocated to and controlled by the host computer 310. The specialized digital signal processing resource or resources may be assigned to individual telephone channels on an as needed basis. The addition of such resources may allow for the use of a simplified host computer 310 and more scalability, since signal processing resources may be added in an appropriate proportion to the number of telephone lines controlled by the system. The responsibility for computing the appropriate echo cancellation filter coefficients could be performed by the signal processing resources, and the final results sent to the line cards 320 to implement the filters in a manner analogous to filter implementation when the host computer 310 computes the optimal echo cancellation coefficients.

The present invention may utilize a computationally efficient filtering algorithm for sequential least-squares (LS) estimation. For example, a fast a posteriori error sequential technique (FAEST) requiring 5 p multiplications and divisions per recursion (MADPR) for autoregressive (AR) modeling and 7 p MADPR for LS finite impulse response (FIR) filtering, where p is the number of estimated parameters, may be used by the host computer 310 to calculate the optimal filter coefficients. However, the invention is not limited this algorithm and other algorithms known to those skilled in the art may be used.

Detection of the presence of significant far end echo using the limited memory capabilities of the line card 320 may be performed using a specialized waveform, such as a brief tone, which has an unambiguous echo signature. Other ways to determine time lags for echo, or filter coefficients when there are frequency varying lag terms, include autocorrelation and other techniques known in the art that compare the received input signal with the transmitted signal. Alternatively, the use of the brief tone or other specialized tone can reduce the need to store and compare audio signals in the input and output buffers 370, 371.

Figure 4:
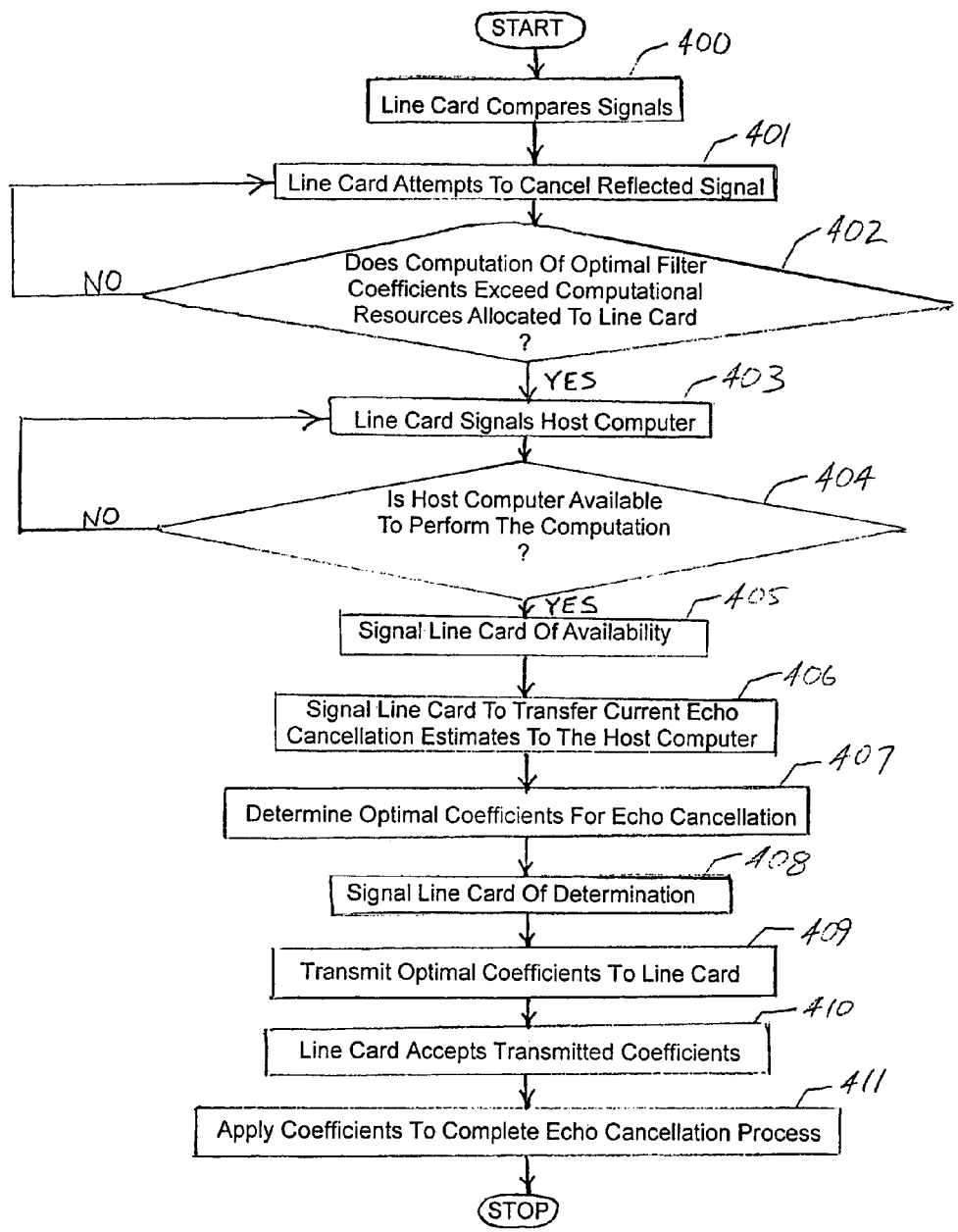
FIG. 4 is a flow chart showing a method of signal processing for echo cancellation according to an embodiment of the present invention.

FIG. 4 is a flow chart showing a method of signal processing for echo cancellation according to an embodiment of the present invention.

For most echo cancellation applications, there is an adaptation period followed by a "lock-in" where the estimated filter coefficients are determined to fit the current channel conditions. Referring to FIG. 4, during an adaptation period, the line card digital signal processors compare the transmitted signal and its reflected return signal (step 400) and attempt to adaptively cancel the reflected signal (step 401). When the line card determines, based upon a convergence criterion, that the computation of the optimal filter coefficients exceeds the computational resources allocated to the line card (step 402), the line card signals the host computer (step 403). The convergence criterion may be, for example, the weighted time average mean-squared error which is minimized by choosing the best filter coefficients or parameters. In addition, the convergence criterion may be any standard criterion known to those skilled in the art. The host computer, based upon a scheduling algorithm, will signal the line card of its availability to perform the computation (steps 404, 405). The scheduling algorithm may be any such algorithm known to those skilled in the art. For example, a scheduling algorithm may be based on first come, first serve scheduling operating in accordance with a priority queue. In addition, some channels may be given preference over other channels based on need.

The available host computer then signals the line card to transfer the current echo cancellation estimates to the host computer for further processing (step 406). The host computer typically has access to a longer representation of the output signal and can search a larger parameter space for the optimal filter coefficients.

When the host computer has determined the optimal coefficients for echo cancellation (i.e., lock-in) (step 407), the host computer signals the line card of the determination (step 408) and transmits the optimal coefficients to the line card (step 409). The line card then accepts the transmitted coefficients (step 410) and applies the coefficients as a filter to complete the echo cancellation process (step 411).

Because the resources needed to apply a filter, once the coefficients have been determined, are significantly smaller than the resources required to compute the optimal filter coefficients, the method, in accordance with the present invention, improves the overall echo cancellation capability of a telecommunications system by allocating more difficult tasks to a host computer. Since the echo cancellation calculation is most often carried out during call initialization or when unexpected changes in line condition occur, competition for the host computer as a shared resource can be managed and balanced using techniques commonly employed in the art.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A system for signal analysis in a network, comprising:
a host processor;
at least one resource connected to the host processor and serving at least one connection to the network; and
at least one filter for modifying a signal, wherein one of the at least one resource and the host processor compute optimal coefficients for the filter, and wherein the at least one resource requests that the host processor compute the optimal coefficients when the at least one resource determines that computation of the optimal coefficients exceeds computational capabilities of the at least one resource.

2. The system of claim 1, wherein the at least one resource requests that the host processor compute the optimal coefficients if a magnitide of residual error exceeds a predetermined value.

3. The system of claim 1, wherein the host processor communicates its availability to compute the optimal coefficients to the at least one resource.

4. The system of claim 3, wherein the availability of the host processor to compute the optimal coefficients is determined based on a scheduling algorithm.

5. The system of claim 1, wherein the host processor transmits the optimal coefficients to the at least one resource and the at least one resource implements the optimal coefficients.

6. The system of claim 1, wherein the at least one filter is used for canceling a reflected signal.

7. The system of claim 1, wherein the at least one resource includes at least one signal processor and at least one data buffer.

8. The system of claim 1, further comprising at least one other processor controlled by the host processor for computing the optimal coefficients in place of the host processor.

9. The system of claim 1, wherein the at least one resource computes the optimal coefficients when computation of the optimal coefficients does not exceed the computational capabilities of the at least one resource.

10. A method for signal analysis in a network, comprising:
attempting, by a first processor, to compute optimal coefficients for filtering a signal;
determining whether computing the optimal coefficients exceeds computational capabilities of the first processor;
continuing to attempt, by the first processor, to compute the optimal coefficients if computing the optimal coefficients does not exceed the computational capabilities of the first processor;
notifying a second processor when computing the optimal coefficients exceeds the computational capabilities of the first processor; and
after notifying the second processor, computing, by the second processor, the optimal coefficients.

11. The method of claim 10, further comprising:
notifying the first processor of an availability of the second processor to compute the optimal coefficients.

12. The method of claim 10, further comprising:
transmitting the optimal coefficients to the first processor; and
implementing the optimal coefficients for filtering the signal.

13. The method of claim 10, wherein the step of computing is performed by a third processor in place of the second processor, and the third processor is controlled by the second processor.

14. The method of claim 10, wherein the step of determining is based on a convergence criterion and the step of computing incorporates an error-feedback driven filtering algorithm.

15. The method of claim 10, further comprising signaling the first processor to transfer to the second processor results of attempts by the first processor to compute the optimal coefficients.

16. A program storage device readable by a machine, tangibly embodying a program of instructions executable by the machine to perform method steps for signal analysis in a network, the method steps comprising:
attempting, by a first processor, to cancel a reflected signal;
determining, after failing to cancel the reflected signal, that computing optimal coefficients for filtering the reflected signal exceeds computational capabilities of the first processor;
notifying a second processor that computing the optimal coefficients exceeds the computational capabilities of the first processor; and
computing, by the second processor, the optimal coefficients in response to the notification.

17. The program storage device of claim 16, further comprising instructions for notifying the first processor of an availability of the second processor to compute the optimal coefficients.

18. The program storage device of claim 16, further comprising instructions for performing the steps of:
transmitting the optimal coefficients to the first processor; and
implementing the optimal coefficients for filtering the signal.

19. The program storage device of claim 16, wherein the step of computing is performed by a third processor in place of the second processor, and the third processor is controlled by the second processor.

20. The program storage device of claim 16, wherein the step of determining is based on a convergence criterion and the step of computing incorporates an error-feedback driven filtering algorithm.

21. The program storage device of claim 16, further comprising instructions for signaling the first processor to transfer to the second processor results of attempts by the first processor to compute the optimal coefficients.

* * * * *